Patented Apr. 20, 1943

2,316,998

UNITED STATES PATENT OFFICE 2,316,998

WATER RESISTANT COMPOSITION MATERIAL AND METHOD OF MAKING SAME

Nathaniel L. Smith, Los Angeles, Calif., assignor to Process Holdings Company, a corporation of Oregon No Drawing. Application October 26, 1939, Serial No. 301,471

10 Claims. (Cl. 106—159)

This invention relates to composition material and method of making same in which the finished end product has water-resistant qualities, or both water-resistant and combustion-resistant qualities. It also relates to the types of such composition materials which have interstitial air cells supplementally introduced into the product to provide insulating qualities. The type of products to which the invention relates are usually initially prepared as a fluid slurry and then dried, though some, such as those having flake asbestos or vegetable fibers as the principal ingredients, may be made by molding the principal ingredient with an adhesive and pressing into desired forms.

The herein described product may be made and the process carried out by manual manipulation, or by any suitable apparatus, one form of which is illustrated and described in a co-pending application for patent filed of even date herewith in the name of John Marchese and Stanley J. Selden for Apparatus and method for making composition material, Serial Number 301,448, filed October 26, 1939.

Among the objects of this invention are to provide a moldable composition material having resistance to water absorption and, if further desired, having also resistance to combustion. Another object of the invention is to provide an aerated moldable composition material having resistance to water absorption and combustion. A further object is to provide an insulating material which may be molded into forms while plastic and which will not chip, warp, spall, or crack upon drying. A further object is to provide an aerated insulating material of very light weight having tensile and transverse strength and compressive resistance, yet having reasonable flexibility; and generally, to improve upon the water-resistant and combustion resistant qualities of present types of products from slurry materials.

With the foregoing and other objects in view, the invention consists of the novel composition of materials and the new structure formed by the novel method herein described, it being understood that variations in materials, quantities, and steps of the method, as well as other minor changes may be resorted to within the scope of the disclosure and appended claims without departing from the spirit of the invention.

The invention herein may have two aspects, both of which may be combined into a single aspect for the greatest efficiency. In its double aspect, the invention consists in the discovery that absorbent products may be rendered resistant to water absorption by incorporation of a soluble protein and a metal precipitating compound; or, alternatively, by incorporation of a soluble soap and a metal precipitating compound. However, the results are more efficient by incorporation in the composition of all three of said components, that is, a soluble protein, a soluble soap, and a metal precipitating compound. Each of the individual reactions has its own peculiarities. The reaction of protein and a metal precipitate, due to its higher viscosity, is best adaptable to surface coating of the minute particles which form the composition and which are not, per se, porous. Therefore, this reaction can thus be best used for water-proofing materials where the chief components are mineral constituents. The reaction of soluble soap and a metal precipitating compound having a lower viscosity, and greater penetrating power, is best suited for saturated water-proofing throughout the body of fibrous materials. However, these two reactions together provide a water-resistant product superior to either alone. This is particularly true of complex mixtures which contain more than one ingredient and contain different types and sizes of inert particles to be water-proofed or rendered non-combustible. For instance, many composition materials contain both a mineral substance and a fibrous substance, in which case each water-proofing reaction tends to make water-resistant that particular ingredient to which it is best adapted or has the greatest affinity. In situations where soluble soap is employed, it is essential that the material to which the water-resistant characteristic is to be imparted shall be in a neutral condition or on the alkaline side, but in the case where the water-resistant compound shall consist only of the soluble protein and the metal precipitating compound, the material to which it is added may be sufficiently acid to solubilize some proteins.

Materials forming the principal solid ingredient or major bulk of such composition materials are usually finely divided or comminuted mineral or fibrous materials, first made into a slurry and then dried. Examples of types of suitable mineral substances are clay, gypsum, bentonite, silicates, diatomaceous earth, asbestos, magnesia, slag, mineral wool, etc. Examples of types of suitable fibrous material which may also be employed as the major bulk of solid ingredients are wood pulp, cotton, flax, stalk fibers of sugar cane, corn, straw and the like. Many suitable compositions including both of such classes of materials may be suitably arranged and examples will be given herein. Of these suggested bulk ingredients, diatomaceous earth is preferred, since it is a cheap, readily accessible, atomic cellular silicate having rough surfaces which are subject to softening with caustic alkali and to which fibrous binders readily adhere.

Products composed of finely divided matter, if not reinforced, usually lack the strength, toughness or flexibility desirable for commercial products, and have a tendency to crack and warp. Unless the major bulk of the material be inherently fibrous, and more particularly if the bulk thereof be comminuted mineral or earthy constituents which do not inherently provide a tough intermeshed body binder agent, fibrous material is provided to firmly knit the other ingredient into a homogeneous mass. This would be particularly true with inert comminuted material such as diatomaceous earth which does not provide an inherent "set" or chemically acting bond. Where flake mineral matter, such as asbestos is a part of the product, it too may serve as a binder agent, but there are many other binders far superior for toughness and binding qualities. Cotton linters, mineral wool and wood pulp, sometimes called paper pulp, are suitable sources for such fibrous binder material, the wood pulp of the paper pulp type, finely shredded, being preferred because of its availability, cheapness, tough flexibility and absorbency of the adhesive.

These major bulk materials and fibers require a mucilaginous material to hold them in a cohesive body. If the major bulk material be organic fiber and not subjected to an aeration, any suitable well-known glue may be employed to hold the fibers in a body. If, however, the end material is to have the characteristic of an aerated body, a highly viscous mucilaginous adhesive is added to the bulk material. For this latter material it is preferred to use organic binder gelatinized vegetable matter having gluten and starch, or protein and starch, such, for instance, as whole grain flour, soy-bean meal (with oil extracted) or ground cassava root, commonly known as manioc. The gelatinized vegetable material may be prepared in a gelatinous colloidal state by any suitable means such as by boiling, but it is preferred that it be gelatinized chemically, as by mixing it with a caustic alkali, such as sodium hydroxide, potassium hydroxide or the carbonates of either.

Since one object of the invention is to provide an insulating material having a greater number of air cells and, therefore, of greater insulating value than the major bulk material, and of lesser weight per unit volume, a frothing or bubble-forming agent is provided as one of the ingredients, preferably a soluble protein which, when subjected to an alkali, such as those hereinabove mentioned, forms a genatinous colloidal protein glue which when added to the bulk material causes the mix to froth upon agitation. Examples of soluble protein which may be employed are gelatin, casein, gluten, albumen, and soy-bean protein. These proteins when mixed with an alkali solution, such as sodium hydroxide, form a gelatinous adhesive mass soluble in water. Since this protein material is used for both its adhesive qualities and its frothing qualities to create additional air cells and to assist in colloidal suspension of the cells in a disperse system, it is desirable that it, and the gelatinous starch adhesive, after being dried, should resist solubility in water. For that reason it is preferred to make a separate gelatinized mix of the starch material and the protein frothing agent simultaneously with the caustic alkali. A fixing agent, exemplified herein as an alkaline earth, such as calcium hydroxide, is added to this colloidal mixture, to react upon the soluble form, not only of the soluble protein, but also on the soluble gelatinized starchy adhesive, to produce an adhesive mixture which resists solubility in water to a certain degree. However, because of its viscosity it does not coat or penetrate the minute particles of comminuted material making up the major bulk of the product, and the result is that dried end products made of the foregoing materials, whether aerated or not, are highly absorbent, and are combustible to the extent that they contain combustible material such as fiber. One of the essentials of a commercially acceptable product of this type is that it be highly resistant to water absorption, whether its main bulk be fibrous, or mineral or whether it be aerated or not aerated. It is highly desirable that it be also resistant to combustion.

To definitely characterize the end product with water-resistant qualities, there is included in the mix the combination of a soluble protein and a metal precipitating compound, or the combination of a soluble soap and a metal precipitating compound, or the combination of a soluble protein and a soluble soap and a metal precipitating compound, each of which combinations will greatly increase the resistance of such slurry materials to absorption of water, after the end product has been dried. By metal precipitating compound is meant a compound of a metal capable of reacting with either a soluble soap or a soluble protein or both soluble soap and protein to form a precipitatable compound. It is preferred that the metal precipitating compound be added separately, for instance, after mixing, the major bulk product and the gelatinous adhesive. For example, in the use of soluble soap and a metal precipitating compound, the procedure is to add them separately, and not at the same time. The soluble soap may be added into the early stages of the mix, and the metal precipitating compound may, in that event, be added as the last ingredient, which thereby permits the metal precipitating compound to react with the soap which has been thoroughly dispersed throughout the mass, and by such reactance coats all the materials with a water-proofing coating. These steps may be reversed, whereby the metal precipitating compound is introduced into the mass and dispersed therethrough, and the soluble soap added later. For another example, in the use of a soluble protein and a metal precipitating compound, those respective ingredients should be added separately; if the casein is first added in the mix, then the metal precipitating compound should be added later, or last; and if the metal precipitating compound is added to the slurry first, then the casein should be added later or as the last ingredient. The reason that the metal precipitating compound should be included separately is that one of the components of the water-resistant formula saturates every ingredient throughout the entire mix, and then the second component, upon addition into the fluid mix, reacts with the first component throughout the entire mass and coats all the materials in the mass with a water-resistant composition. Some of the metal precipitating compounds not only impart water-proofing qualities but also combustion-resisting characteristics, and their inclusion is preferred if it is desired to increase combustion-resistant characteristics of the dried end product.

Examples of metal precipitating compounds, generally a metal salt, are copper sulphate, zinc sulphate, or their ammonia complexes or their chlorides; also calcium chloride, magnesium chloride, ferric chloride, and aluminum sulphate. Experiments also demonstrate that in making materials which require baking at temperatures around 200° F. or higher, use can also be made of the relatively insoluble metallic compounds such as aluminum hydroxide and ferric hydroxide, but the definite reaction of the heat thereon is believed to be not well understood in the chemical arts.

Among the metal precipitating compounds, if considered solely for their efficiency as water-resisting agents, copper salts are preferable. However, aluminum salts or zinc salts produce water-resistant products which are also resistant to combustion, whereas some other metal salts produce products readily capable of supporting combustion in those products which contain organic fibrous materials as the major bulk, or organic binders, or both, and in such event it is preferred to use aluminum salts or zinc salts as the metal precipitating compound, wholly or partially in place of any particular metal salt which may solely produce better water-resistance than the aluminum salts or the zinc salts. As previously stated, if the product is to be dried by baking at a temperature above 200° F., aluminum hydroxide may be employed in lieu of aluminum salts, as the sulphate. In those slurry products where the aqueous mass is alkaline, considerable difficulty is encountered in adding the metal salts, in that side reactions will cause most of these metal salts to precipitate as hydroxides and produce inferior water-resistant qualities when subjected to heat in drying, with the exception of aluminum hydroxide mentioned above. The metal precipitating compounds, which are essentially soluble metallic salts as copper sulphate, copper chloride, zinc chloride, zinc sulphate, etc., will precipitate immediately as insoluble hydroxides in a neutral or alkaline solution. These insoluble hydroxides have very little water repellent properties in the dried state of the end product to be formed. This reaction should therefore be inhibited if a metal precipitating compound is to be used in a neutral or alkaline state. To prevent such side reactions, it is desirable to employ with the metal salts which are subject to the side reactions, an agent reactant with said metal salts and capable of inhibiting the decomposition of said salts into precipitatable compounds of said metals in an alkaline slurry. In the case of copper, nickel, and zinc salts, the addition of a sufficient quantity of aqueous ammonia to produce their ammonia complex salts produces a much superior product by preventing these side reactions. The use of aqueous ammonia with these metal precipitating salts, for example, to produce complex copper ammonia sulphate, or zinc ammonia chloride, prevents the precipitation of the undesired hydroxides. These complexes can then react with the other water repellent ingredient, as for example, the soluble soap or the soluble protein, or this proper reaction will take place when the ammonia is driven off during a heat drying process. One might use complex salts, other than those of ammonia, of the metal precipitating compounds, which can also prevent alkaline side reactions. In this class may be mentioned the cyanide complexes of some metal salts, complex halides, complex oxalates, and the formation of soluble amphoteric hydroxides, etc. However, all of these are, in general, inferior to the ammonia complex due to the fact that the ammonia is driven off during the drying process. The other complexes remain or take forms which are but poorly water-resistant.

For example, I have found that the use of the soluble amphoteric hydroxide of aluminum or zinc produces little beneficial effect towards water-resistance with either soluble protein, or soluble soap constituents, or both. As a rule, these complexes do add to the resistance of the material to combustion, however.

Incidentally, in utilizing an alkaline glue, the use of a metal precipitating compound, such as copper sulphate or zinc sulphate, etc., which are essentially very acid substances, destroys the efficiency of that glue. The glue, which must be in an alkaline state to have its full adhesiveness, must necessarily lose some of that adhesiveness when it is brought in contact with an acid producing substance such as these metal precipitating compounds. The employment of an alkaline inhibitor, as ammonia, brings these metal precipitating compounds to the alkaline side in which state they may be added to the alkaline glues freely without the loss of adhesiveness or strength.

The soluble soap may be of any suitable type such as sodium stearate, oleate, or palmitate, or their other soluble salts of the potassium or ammonium reactions. Any of the soluble saponified compounds of the natural fatty acids may also be employed for the purpose of the soluble soap. The metal precipitate reacts on the soluble soap to set it into an insoluble state. It is preferred to employ a soluble saponified rosin soap, resinate or abietate, because it is cheaper than most of the other commercially available soluble soap products. When rendered insoluble by reaction of a metal precipitate, it produces a more satisfactory product as to water-resistance in the dried end product at a minimum of fire hazard, and it has superior characteristics as a binding agent. In those instances where an aerated product is to be produced, necessitating the creation of a stable froth in making the product as in thermal and sound insulating materials, the rosin soap is much superior to the fatty acid soaps, since the saponified rosin soap will facilitate formation of a better stabilized froth both in quantity and quality, at almost any temperature, whereas many other frothing agents, like casein in the protein group, require maintenance of an abnormally low temperature. For instance, by employing two slurries, one of which did not contain saponified rosin, whereas the other contained one per cent (1%) of rosin powder (which was saponified by the alkali in the slurry), the slurries being otherwise identical, and both whipped for ten minutes at a normal temperature of 90° F., the slurry which did not contain the saponified rosin increased its volume approximately ten per cent (10%), whereas the slurry which included the saponified rosin increased its volume approximately one hundred and eleven per cent (111%). In this connection, it should be stated that where saponified rosin solution is employed, the slurry should be brought to at least a neutral and preferably to an alkaline state, but this is not essential if the material to which the saponified rosin solution is added is itself sufficiently alkaline to at least neutralize and preferably alkalize the acidity of wood or gum rosin powder.

It is believed that the manufacture of the resinate is well understood, but a typical procedure is to heat to boiling a solution of 27 lbs. of 98% sodium hydroxide in 300 lbs. of water; add 140 lbs. of pulverized wood rosin. This is kept and stirred for about three hours, and then diluted with water to the desired consistency.

For purposes of illustrating the water-resisting properties accomplished by the introduction of the metal precipitating compound with the protein, or the metal precipitating compound with the resinate, or the introduction of the combination of both in a slurry composition, the following slurry formula is given of one form in which the invention may be exemplified:

| | Percent |
|---|---|
| Diatomaceous earth | 23.0 |
| Wood pulp fiber | 1.0 |
| Starch flour | 0.7 |
| Casein | 1.0 |
| Caustic sodium hydroxide | 0.4 |
| Calcium hydroxide (lime) | 0.2 |
| Water (approximate) | 73.7 |
| | 100.0 |

In making such a slurry, it may be stated that the starch flour and the casein, may be first previously gelatinized with the caustic and about one-tenth of the water, and the lime fixing agent added thereto, before placing this adhesive mixture into the slurry.

In concentration of alkalinity, the usual pH of the fluid slurry is between 10 and 11. The concentration of metallic salts and soluble soap is of course dependent upon the amount of water resistant qualities desired; examples of such concentrations are given in the schedule below but are subject to variations according to the desired characteristic of water-resistance.

The following table is illustrative of the water-resistant effect of incorporating the subject matter of this invention into the slurry after all the other ingredients are mixed, showing the varying water-resisting qualities of the slurry when made into a porous aerated board, by baking same at 360° F. until dried, in each intsance. Each of the following ingredients are added individually, dissolved in a small percentage of the water, with the exception of the copper sulphate and the ammonia, which are first mixed together as a compound first.

| | Percentage gain in weight upon immersion in water for five minutes |
|---|---|
| Original board, according to above slurry | 387 |
| The following percentages of ingredients are based on the above slurry as 100%: | |
| (a) Reaction of metal precipitating compound and soluble protein (1% casein in slurry): | |
| (a—1) Added 0.64% copper sulphate + 0.35% ammonia | 28 |
| (a—2) Added 0.46% copper sulphate + 0.25% ammonia; then added 0.13% aluminum sulphate | 43 |
| (b) Reaction of metal precipitating compound and soluble soap (sodium resinate): (Eliminating the 1% casein from the above slurry and increasing the diatomaceous earth and water each 0.5% to maintain the 100% base of the slurry): | |
| (b—1) Added 0.64% copper sulphate + 0.35% ammonia; then added 0.15% sodium resinate | 14 |
| (b—2) Added 0.46% copper sulphate + 0.25% ammonia; then added 0.13% aluminum sulphate; and then added 0.15% sodium resinate | 24 |
| (c) Reaction of metal precipitating compound soluble protein (casein) and soluble soap (sodium resinate): (In this reaction the 1% casein is included in the slurry.) | |
| (c—1) Added 0.64% copper sulphate + 0.35% ammonia; then added 0.15% sodium resinate | 6 |
| (c—2) Added 0.46% copper sulphate + 0.25% ammonia; then added 0.13% aluminum sulphate; and then added 0.15% sodium resinate | 11 |

Another example, illustrative of a suitable non-aerated slurry of an absorbent material, is of approximate amounts of ingredients as follows:

| | Per cent |
|---|---|
| Magnesium carbonate | 10.0 |
| Asbestos fiber | 8.0 |
| Gelatin (karatin) as a protein | 1.3 |
| Water | 80.7 |
| | 100.0 |

| | Percentage increase of weight upon immersion in water for 5 minutes |
|---|---|
| The above slurry, when dried at approximately 360° F. | 283 |
| Reaction of protein, (1.3% in slurry), metal precipitating compound, and soluble soap: Added zinc chloride 0.54%, + ammonia 0.51%; then added sodium resinate 0.65% | 21 |

The mixing of the slurries may be accomplished manually or by any suitable mixing means, and, where desired, may be aerated manually, mechanically, or by chemical ebullition of gases therein. Mechanical mixing and aeration are preferred for a better dispersion of both particles of the mix and the entrapped air.

While the fluid slurry mix may be formed in individual forms or trays of any desired shape or type, depending on the desired shape of the end product, the greatest demand for this type of product is in some type of flat body, whether it be thick such as a brick, or thin, such as a relatively thin sheet, or a board. In commercial production the process of manufacture should be continual, for which purpose the fluid slurry is fed upon a suitable continuous conveyor belt, such as reticulated mesh metal screen, and thus fed into a drying furnace.

Where the end product is to be formed into a board or slab, it is preferred that the wet slurry shall be deposited upon wetted sheet base material such as ordinary wood pulp paper, which is carried in overlying relation on the conveyor. Since the paper base when wetted has a characteristic of shrinkage which is accentuated transversally to the direction of tension on the wet paper sheet, I exert a transverse tension on the paper after it is wetted to compensate for the longitudinal tension, and thereby eliminate longitudinal creases in the paper base as it is fed under the slurry. Preferably, the paper is provided with relatively small perforations therein, so as to permit better, quicker and more even drying of the slurry. These perforations may be formed in any suitable way, but it has been found advantageous to make the perforations with small upstanding tabs or tongues which may engage into the body of the wet slurry thereon. The wet waterproofing compositions in the body of the product also impart waterproof characteristics to such paper base by absorption therein.

After feeding on the paper base and while still wet, the slurry is agitatorially manipulated on either of its surfaces, or both. On the bottom surface a vibrator may be employed beneath the conveyor on which the paper base and slurry are carried. On its upper surface it may be manipulated by a transversely reciprocally oscillating screed in facial contact with the slurry in a manner that the frictional hold between the adhesive wet slurry and the face of the screed causes the slurry to be "pulled" or "massaged" back and forth in the nature of a dragging action. Just what physical phenomena is accomplished by the action of the vibrator or the screed is not well recognized, but it has been demonstrated that the end product is much superior in appearance, uniformity of texture and resistance to cracking or peeling, if the fluid and spread slurry is thus manipulated before it enters the drying furnace. Without intending to be concluded by any particular theory of the result of such manipulation, it is believed that such manipulation of the wet slurry probably accomplishes several results, among which may be mentioned that the "fines" in the material are brought nearer the surface, thus making the surface of the finished product much more uniform in appearance and texture. Secondly, most of such materials contain some kind of fibrous or flaky binder material, and it has been observed that when this type of screed manipulation is employed there appears a noticeable tendency of the fibers at the opposite surface portions of the material, for a depth of about one-eighth of an inch, to become aligned more or less longitudinally of the direction of movement of the material on the screen while the fibers of the intermediate or vertically central portion of the body remain miscellaneously arranged or helter-skelter, which results in an end product having the nature of laminated layers with fibers somewhat relatively perpendicularly arranged in the abutting layers, thus giving an exceptional degree of strength to the end product slab or board. Since the frictional surface tension resistance to transverse movement of the entire slurry is at the opposite faces which are in contact with the paper and screen (at bottom) and screed (at top), it is advanced as a belief that the dragging or massaging by the screed noticeably rearranges the fibers adjacent the opposite surfaces. Thirdly, such manipulation probably causes the heavier portions of the slurry to settle to some extent so that more of the free water in the slurry is nearest its upper surface, and since the bottom surface of the slurry is coated with paper resting upon the screen belt and the metal plate whereas the upper surface is completely exposed, the heat in the furnace drier more readily evaporates the water in the upper portion of the slurry than in the lower portion; if the upper portion of the spread slurry carries a greater percentage of water than the lower portion this more exposed and more rapid drying of the upper portion of the slurry equalizes the lesser liquidity and lesser exposure of the bottom portion so that drying is equalized throughout the slurry body and prevents warping and cracking in the finished product. The perforations in the base paper materially assist in uniform drying of the lower portion of the slurry by permitting ready escape of steam through the reticulated body of the underlying screen.

Mechanisms for accomplishing the steps of manufacture are illustrated and described in the aforesaid Marchese and Selden copending patent application. The drying of the slurry may be by air in some climates and temperatures, but in commercial production drying by baking in a furnace is almost a necessity. Drying temperatures of between 300° and 400° F. are suitable. After drying, the end product, if in sheet form, makes a very much better material in appearance if its superficial upper-crusted surface is removed by sanding. This is very important in aerated products intended for insulating purposes, since the upper crust formed from a wet slurry is lacking in uniformity of air cells, and it is desirable to remove such crust to expose an even and well distributed air cell structure immediately below such crust. After drying, and either before or after removal of the upper-face crust, the board so formed may be cut into desired sizes and shapes by any suitable cutting apparatus such as exemplified in said Marchese and Selden copending application.

In the diatomaceous earth example given herein, one manner of treatment of the ingredients is as follows:

The diatomaceous earth and shredded wood pulp are thoroughly mixed dry, and about nine-tenths of the water added to make a thick fluid mix. Separately, the starch or flour adhesive and the protein are gelatinized by thoroughly mixing them with the caustic alkali, using for the purpose a portion of about one-tenth of the water, and adding thereto the calcium hydroxide or lime, the adhesive mix being then incorporated into the diatomaceous earth and fiber mix. If the protein and metal precipitating compound alone are to be employed as the waterproofing agent, the metal precipitating compound should then be added separately to the mix, since the mix already contains casein as a protein thoroughly dispersed therein. If it is desired to eliminate the protein and depend for waterproofing on the introduction of a soluble soap and a metal precipitating compound, a soluble soap should be introduced into the mass separately from the metal precipitating compound, since the caustic alkali already in the mix is sufficient to saponify the rosin, and provide a resinate, which, because of its qualities as a whipping agent will provide a stabilized foam or froth in combination with the gelatinized starch of the flour, if the product is to be aerated. However, best results in water-resistant and combustion-resistant characteristics are obtained by employing both the soluble soap and the protein with the metal precipitating compound, and in this phase, the protein (casein) and caustic alkali are already in the mix and it is necessary to add only the powdered rosin and metal precipitating compound, the rosin being saponified by the alkali, and insolubilized by the metal precipitating compound which should be added separately. Obviously the rosin may be first converted into a resinate if desired, and where the mass is not already sufficiently alkaline, the resinate reaction must be carried out separately. When producing the ammonia complexes of the metal precipitating compound, which has been found highly desirable to prevent side reactions as metal hydroxides, the aqueous ammonia ingredient is added to the mix after having first been combined with the metal precipitating compound.

In those cases where the end product is to have insulating characteristics the mass may be aerated in any suitable manner, chemically or mechanically, which will spread the occluded air in a disperse system of bubbles, in a well known manner. If aerated by mechanical whipping, auxiliary air may be forced into the mass during whipping of the mass as the batches of the several groups of materials are successively added. The whipping or frothing of proteins requires maintenance of a relatively low temperature for best results. With casein, a temperature of approximately 45° F. is desirable. But when a soluble soap, and especially rosin or resinate, is introduced, the whipping may be done at practically any normal temperature, such as a range between 45° F. and 100° F.; also, the froth is formed quicker and in greater volume, for all of which reasons the inclusion of a soluble soap, and more particularly a resinate or abietate, is preferred.

In some cases, the end product may employ one of the components of the water-resistant or combustion resistant formula because of its other characteristics and advantages in the manufacture of the product, as for example, the soluble protein may also be employed for its adhesive characteristics, or the soluble resinate may also be employed because of its advantages as a whipping or frothing agent. It is not necessary to add the other complementary ingredients, as the metal precipitating compound, in the initial state or "slurry." The end product may be first dried, molded, or baked into its final form, and then immersed, sprayed, or painted with a solution of the ingredient or combination of ingredients which have theretofore been omitted from the mix. A process such as last described would present the possibility of producing a resistant or non-resistant product as desired.

I claim:

1. The process of making a water resistant porous insulating product which comprises treating an aqueous slurry consisting essentially of finely divided mineral material and having intermixed therewith a water soluble gelatinized vegetable binder and a fibrous material in an appreciable amount sufficient to form a cohesive end product with a water soluble soap, a water soluble metal salt capable of reacting with said soap to form a precipitatable compound, and ammonia in amount sufficient to form a water soluble complex with said metal salt, aerating said slurry, spreading said slurry to the desired shape, and drying the mass to liberate the ammonia and precipitate the precipitatable compound.

2. The process of making a water resistant porous insulating product which comprises treating an aqueous slurry consisting essentially of finely divided mineral material and having intermixed therewith a water soluble gelatinized vegetable binder and a fibrous material in an appreciable amount sufficient to form a cohesive end product with a water soluble soap, a water soluble protein, a water soluble metal salt capable of reacting with said soap and protein to form precipitatable compounds, and ammonia in amount sufficient to form a water soluble complex with said metal salt, aerating said slurry, spreading said slurry to the desired shape, and drying the mass to liberate the ammonia and precipitate the precipitatable compounds.

3. The process of making a water resistant porous insulating product which comprises treating an aqueous slurry consisting essentially of finely divided inert mineral material and having intermixed therewith a water soluble gelatinized vegetable binder and a fibrous material in an appreciable amount sufficient to form a cohesive end product with a water soluble resinate soap, a water soluble metal salt capable of reacting with said soap to form a precipitatable compound, and ammonia in amount sufficient to form a water soluble complex with said metal salt, aerating said slurry, spreading said slurry to the desired shape, and drying the mass to liberate the ammonia and precipitate the precipitatable compound.

4. The process of making a water resistant porous insulating product which comprises treating an aqueous slurry consisting essentially of finely divided inert mineral material and having intermixed therewith a water soluble gelatinized vegetable binder and a fibrous material in an appreciable amount sufficient to form a cohesive end product with a water soluble resinate soap, a water soluble protein, a water soluble metal salt capable of reacting with said soap and protein to form precipitatable compounds, and ammonia in amount sufficient to form a water soluble complex with said metal salt, aerating said slurry, spreading said slurry to the desired shape, and drying the mass to liberate the ammonia and precipitate the precipitatable compounds.

5. The process of making a water resistant porous insulating product which comprises treating an aqueous slurry consisting essentially of finely divided diatomaceous earth and having intermixed therewith a water soluble gelatinized vegetable binder and a fibrous material in an appreciable amount sufficient to form a cohesive end product with a water soluble resinate soap, a water soluble metal salt capable of reacting with said soap to form a precipitatable compound, and ammonia in amount sufficient to form a water soluble complex with said metal salt, aerating said slurry, spreading said slurry to the desired shape, and drying the mass to liberate the ammonia and precipitate the precipitatable compound.

6. The process of making a water resistant porous insulating product which comprises treating an aqueous slurry consisting essentially of finely divided diatomaceous earth and having intermixed therewith a water soluble gelatinized vegetable binder and a fibrous material in an appreciable amount sufficient to form a cohesive end product with a water soluble resinate soap, a water soluble protein, a water soluble metal salt capable of reacting with said soap and protein to form precipitatable compounds, and ammonia in amount sufficient to form a water soluble complex with said metal salt, aerating said slurry, spreading said slurry to the desired shape, and drying the mass to liberate the ammonia and precipitate the precipitatable compounds.

7. An aqueous slurry consisting essentially of an aqueous suspension of finely divided mineral material intermixed with a water soluble gelatinized vegetable binder and a fibrous material in an appreciable amount to form a cohesive end product admixed with a sufficient amount of a water soluble ammonium metal complex soap to impart waterproofing properties to the end product which upon the application of heat will be converted into a waterproof porous insulating product with the liberation of ammonia and water.

8. An aqueous slurry consisting essentially of an aqueous suspension of finely divided mineral material intermixed with a water soluble gelatinized vegetable binder and a fibrous material in an appreciable amount to form a cohesive end product admixed with a sufficient amount of a water soluble ammonium metal complex soap and protein to impart waterproofing properties to the end product which upon the application of heat will be converted into a waterproof porous insulating product with the liberation of ammonia and water.

9. An aqueous slurry consisting essentially of an aqueous suspension of finely divided diatomaceous earth intermixed with a water soluble gelatinized vegetable binder and a fibrous material in an appreciable amount to form a cohesive end product admixed with a sufficient amount of a water soluble ammonium metal complex soap to impart waterproofing properties to the end product which upon the application of heat will be converted into a waterproof porous insulating product with the liberation of ammonia and water.

10. An aqueous slurry consisting essentially of an aqueous suspension of finely divided diatomaceous earth intermixed with a water soluble gelatinized vegetable binder and a fibrous material in an appreciable amount to form a cohesive end product admixed with a sufficient amount of a water soluble ammonium metal complex soap and protein to impart waterproofing properties to the end product which upon the application of heat will be converted into a waterproof porous insulating product with the liberation of ammonia and water.

NATHANIEL L. SMITH.